United States Patent

Kumar et al.

[11] Patent Number: 5,414,615
[45] Date of Patent: May 9, 1995

[54] PATTERN GENERATION CONTROL FOR INVERTER DRIVES

[75] Inventors: Ajith K. Kumar; Thomas D. Stitt, both of Erie, Pa.

[73] Assignee: General Electric Company, Erie, Pa.

[21] Appl. No.: 261,656

[22] Filed: Jun. 17, 1994

Related U.S. Application Data

[63] Continuation of Ser. No. 85,463, Jun. 30, 1993, abandoned, which is a continuation of Ser. No. 781,514, Oct. 22, 1991, abandoned, which is a continuation-in-part of Ser. No. 618,787, Nov. 27, 1990, Pat. No. 5,168,439.

[51] Int. Cl.⁶ .................................. H02M 7/44
[52] U.S. Cl. ........................... 363/95; 363/41; 318/811; 364/480
[58] Field of Search ................. 363/41, 95, 97; 318/811; 364/480–486; 323/241, 283

[56] References Cited

U.S. PATENT DOCUMENTS

| | | | |
|---|---|---|---|
| 4,047,083 | 9/1972 | Plunkett | 318/231 |
| 4,105,939 | 8/1978 | Culbertson | 318/599 |
| 4,587,605 | 5/1986 | Kouyama et al. | 363/41 |
| 4,698,744 | 10/1987 | Itani et al. | 364/140 |
| 4,771,224 | 9/1988 | Elms | 318/809 |
| 4,870,556 | 9/1989 | Inaba et al. | 363/41 |
| 4,924,373 | 5/1990 | Inaba et al. | 363/95 |

OTHER PUBLICATIONS

Control of Electrical Drives—W. Leonhard—1985—All pp. 1-341.

Primary Examiner—Steven L. Stephan
Assistant Examiner—Adolf Berhane
Attorney, Agent, or Firm—Ann Marie Kratz; Marvin Snyder

[57] ABSTRACT

A device in which a processor controls a desired frequency and a desired instantaneous angle of a pattern generation circuit. The processor also controls a desired amplitude of the system. The pattern generation circuit includes a ROM having firing data for only a portion of the angles for which the circuit produces output. Output for the angles stored in the PROM and for the remaining angles is generated using the partial data from the PROM. The processor selects the desired voltage levels of the motor output, and can instantaneously set an angle of the output.

14 Claims, 6 Drawing Sheets

PATTERN GENERATION CONTROL FOR INVERTER DRIVES

This application is a Continuation of application Ser. No. 08/085,463, filed Jun. 30, 1993, now abandoned, which is a Continuation of application Ser. No. 07/781,514, filed Oct. 22, 1991, now abandoned, which is a continuation-in-part application of U.S. patent application Ser. No. 07/618,787 of Kumar et al., filed Nov. 27, 1990, now U.S. Pat. No. 5,168,439, which is herein expressly incorporated by reference.

BACKGROUND OF THE INVENTION

This application relates generally to inverter circuits for converting dc voltage to ac voltage and, more particularly to a control circuit for generating firing signals for an inverter circuit for converting dc voltage to three phase variable amplitude and frequency ac voltage. While the invention of the present application is generally applicable to such power conversion, it is particularly applicable to a controller for adjustable drive ac motors for electrically propelled rail vehicles.

Typically, in the conversion of dc voltage to ac voltage, an ac or sine wave reference signal is compared with a higher frequency wave to create a pulse width modulation (PWM) signal proportional to the reference signal. The resulting PWM signal is used to drive a power switching inverter, which converts dc voltage into ac voltage and is normally constructed of unidirectional conducting switching elements such as power transistors, thyristors, gate turn off (GTO) devices, or the like. The PWM mode of operation must ultimately give way to a square wave mode of operation to obtain the maximum possible output voltage from any conversion arrangement. Unfortunately, a problem is encountered in the transition between triangle interception PWM and unmodulated square wave modes of operation.

A number of attempts have been made to solve this problem. One proposed solution is to provide a series of transitional PWM modes of operation wherein the timing waveform is synchronized to the reference signal, its frequency or slope is variously modified, and/or the amplitude of the reference signal is varied as necessary to reduce the number of "chops" or transitions of the signal which constructs the ac voltage to zero without discontinuity in the amplitude of the fundamental output waveform.

Another proposed solution is disclosed in U.S. Pat. No. 4,047,083 wherein a control arrangement is made up of three modes of operation: the first mode is a triangle interception PWM operating mode which is used as long as an amplitude control signal does not exceed a predetermined reference value and the speed of a controlled motor does not exceed a predetermined reference speed; The second operating mode is a dual dc level set transition mode in which the lower level is varied as a function of the higher level so as to minimize selected harmonics of the ac voltage component; and the third operating mode is square wave mode. Transition from the second mode to the third mode is performed by transition means forming a part of the patented invention. For additional information regarding these prior art control arrangements, reference should be made to U.S. Pat. No. 4,047,083 which is expressly incorporated herein by reference.

While the control arrangements of the referenced U.S. '083 patent provides a substantial improvement over prior existing and proposed arrangements, there remains a need for an improved simplified control arrangement for generating firing signals for an inverter drive circuit for converting dc voltage to three phase variable amplitude and frequency ac voltage, which is inexpensive, versatile, and adaptable to the requirements of specific applications. Such improved arrangements not only advance the art, but also provide attractive alternatives thereto while improving the performance of systems incorporating them.

SUMMARY OF THE INVENTION

The present invention overcomes the problems and disadvantages of the prior art by employing tables for a range of angles smaller than 0° through 360°, the tables stored in a PROM. The data in the tables and a sector value from a sector counter are used by an ac generating means to generate a three phase variable amplitude and frequency ac signal for a range of 0° through 360°. These tables are addressed by a table select value and an output of an angle counter. A microprocessor monitors the current sector and angle and can change or reset either or both of the sector and angle counter as required. The processor can also select different ones of a plurality of pattern tables in the PROM, and can set an operating frequency of the motor.

In accordance with the purpose of the invention, as embodied and broadly described herein, the invention is a control circuit for generating firing signals for an inverter for converting dc voltage to three phase variable amplitude and frequency ac voltage, comprising: memory means for storing firing pattern signals defining on/off status of switching devices making up the inverter circuit, the memory means storing firing pattern signals only for a predetermined range of degree values that is smaller than a range 0° through 360°; writable counter means for outputting successive addresses to the memory means to cause the memory means to output successive ones of the firing pattern signals; and firing pattern generating means, connected to the memory means, for inputting the firing pattern signals output by the memory means and for generating firing signals for a range of values larger than the range stored in the memory means.

In further accordance with a purpose of the invention, the invention is a control circuit for generating firing signals for an inverter for converting dc voltage to three phase variable amplitude and frequency ac voltage, comprising: memory means for storing a plurality of firing pattern signals defining on/off status of switching devices making up the inverter circuit; clock means for generating a clock signal in accordance with a received frequency value; readable/writable counter means for outputting an address to the memory means in accordance with the clock signal to cause the memory means to output a one of the firing pattern signals; and processor means for monitoring the output of the readable/writable counter means and for sending a new frequency value to the clock means to control the frequency of the three phase ac voltage generated by the inverter in accordance with the monitored value from the readable/writable counter means.

In further accordance with a purpose of the invention, the invention is a control circuit for generating firing signals for an inverter for converting dc voltage to three phase variable amplitude and frequency ac voltage, comprising: memory means for storing a plurality of firing pattern signals defining on/off status of switching devices making up the inverter circuit; clock means for generating a clock signal in accordance with a received frequency value; writable counter means for outputting an address to the memory means in accordance with the clock signal to cause the memory means to output a one of the firing pattern signals; and processor means for receiving a desired frequency value and for sending the desired frequency value to the clock means to control the frequency of the three phase ac voltage generated by the inverter in accordance with the monitored value.

In further accordance with a purpose of the invention, the invention is a control circuit for generating firing signals for an inverter for converting dc voltage to three phase variable amplitude and frequency ac voltage, comprising: memory means for storing firing pattern signals defining on/off status of switching devices making up the inverter circuit, the memory means storing firing pattern signals for a plurality of angles; writable counter means for outputting an address to the memory means to cause the memory means to output a one of the firing pattern signal for a one of the plurality of angles; and processor means for receiving a desired angle value and for writing a count value into the writable counter means in accordance with the desired angle value to control the angle of the three phase ac voltage generated by the inverter in accordance with the received angle value.

In further accordance with a purpose of the invention, the invention is a control circuit for generating firing signals for an inverter for converting dc voltage to three phase variable amplitude and frequency ac voltage, comprising: memory means for storing firing pattern signals defining on/off status of switching devices making up the inverter circuit, the memory means for storing firing pattern signals in a plurality of tables, at least one of the tables representing a respective one of a plurality of voltage levels; writable table select means for outputting an address to the memory means to cause the memory means to select a one of the tables of the memory means; and processor means for receiving a desired voltage value and for sending a table select value to the table select means in accordance with the desired voltage to control the table selected by the table select means, and thus to control the voltage level of the three phase ac voltage generated by the inverter in accordance with the calculated value.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 7 is a table showing which bits of a table entry having the format of FIG. 5 are used to create the output of FIG. 3;

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
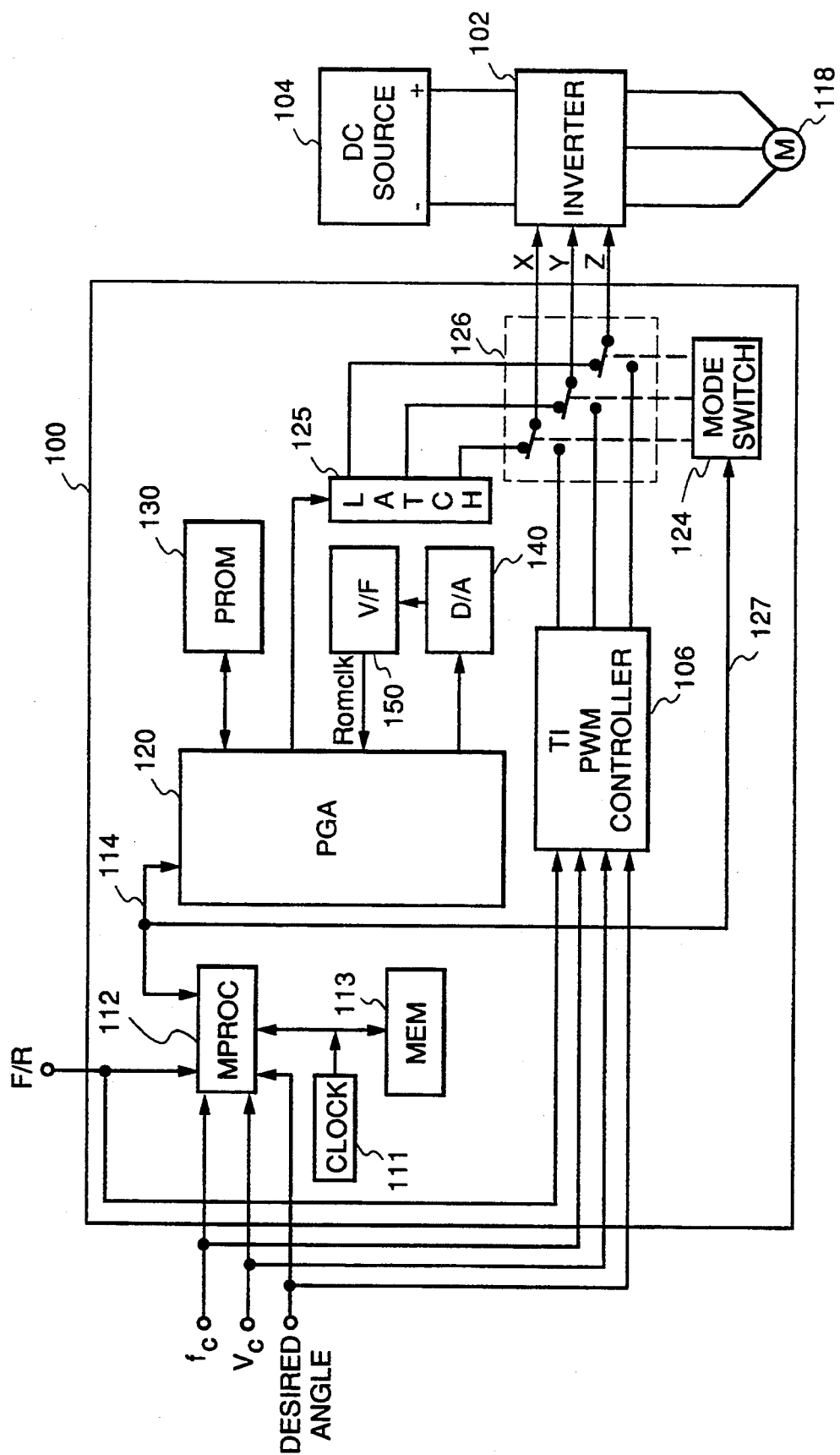
FIG. 1 is a block diagram of a preferred embodiment of the present invention.

While the invention of the present application can be used for inverter control throughout the entire operating range of an inverter, it will be described with reference to a working embodiment which operates in conjunction with a triangle interception PWM controller. For ease of description and understanding, the illustrated embodiment of the present invention can be thought of as operating in the motor drive of previously referenced U.S. Pat. No. 4,047,083 and taking the place of all but the triangle interception (TI) PWM portion of the waveform generator of the reference patent. The switch-over between triangle interception PWM control and the control of the invention of the present application is performed by processor means of the present invention as will become apparent. As illustrated in FIG. 1, an inverter control circuit 100 generates firing signals X, Y, Z for an inverter circuit 102 which converts DC voltage from a DC source 104 to three phase variable amplitude and frequency AC voltage to drive an AC motor 118.

FIG. 1 shows a processor (MPROC) 112, including a memory 113, which stores a software program executed by processor 112, and including a clock 111. Memory 113 and clock 111 may be located outside of processor 112 in other embodiments of the present invention. FIG. 1 also includes a triangle (TI) pulse width modulator (PWM) controller 106, a programmable gate array (PGA) 120, a mode switch 124, a latch 125, switches 126, a PROM 130, a D/A converter 140, and a V/F (voltage to frequency) converter 150.

In FIG. 1, a frequency command Fc, a voltage amplitude command Vc, and a "desired angle" command are input to processor 112. These commands indicate a desired frequency, voltage, and angle respectively, at which motor 118 should be driven. The signals Fc, Vc, and angle may be generated, for example, from an external source, or may be generated by processor 112 using a method not described herein. Processor 112 also receives a F/R (forward/reverse) signal indicating a desired direction of rotation of the motor 118. Each of the signals Fc, Vc, and F/R is also input to TI PWM controller 106. Processor 112 controls mode switch 124 to set switches 126 to select output from either TI PWM controller 106 or latch 125, which contains the output of PGA 120, as described below.

In the described embodiment, processor 112 initially sets a desired voltage amplitude and desired instantaneous angle into PGA 120 via line 114, as described below. Counters in PGA 120 are incremented (or decremented) at a regular rate according to an output signal ROMCLK of V/F converter 150. The signal ROMCLK is generated in accordance with a frequency input to D/A 140. This frequency also may be set by processor 112 as described below.

PGA 120 uses the signal ROMCLK to increment (OR DECREMENT) counters in PGA 120 that are used to address PROM 130, as described below. PGA 120 uses the output of PROM 130 to generate firing signals X, Y, and Z for inverter 102, which are sent through latch 125.

In the described embodiment, PGA 120 is preferably a XILINX 3064 PGA; V/F converter is preferably a Burr Brown VFC110 voltage controlled oscillator; D/A converter 140 is preferably an Analog Devices DAC703 digital-to-analog converter; processor 112 is preferably an Intel 80960CA microprocessor; memory 113 is preferably embodied in Intel 28F010 memory; and PROM 130 is preferably a plurality of Intel 27512 EEPROMs.

Figure 4:
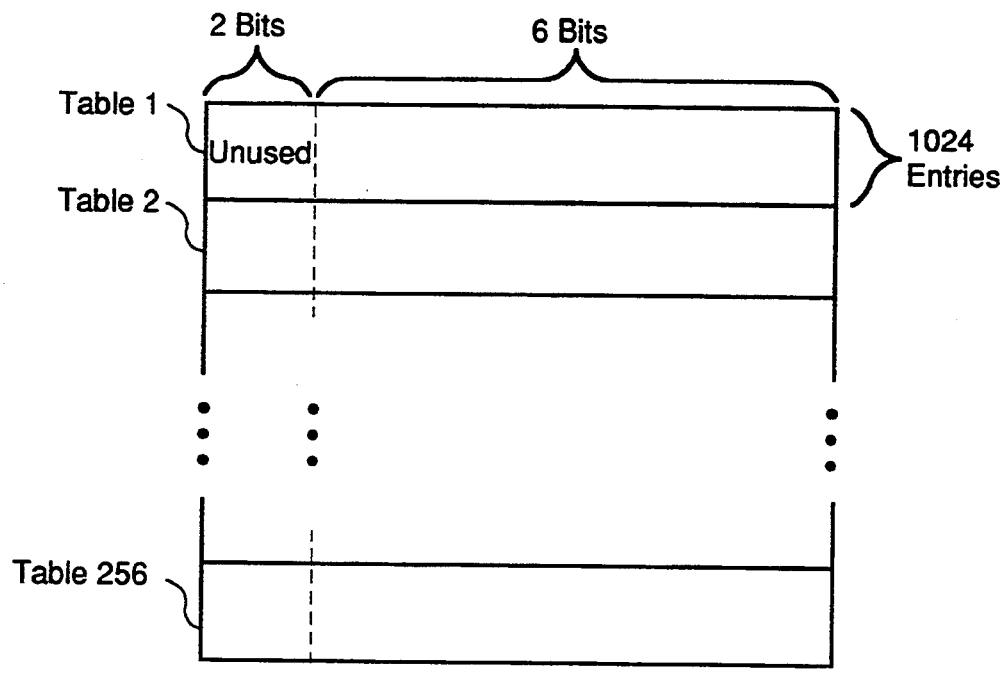
FIG. 4 shows a data structure in a PROM of FIG. 1.
Figure 5:
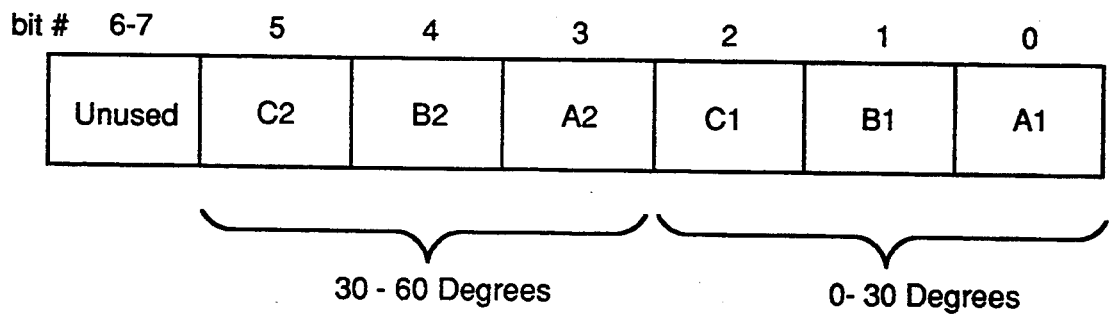
FIG. 5 shows a format of one entry in the data structure of FIG. 4.
Figure 6:
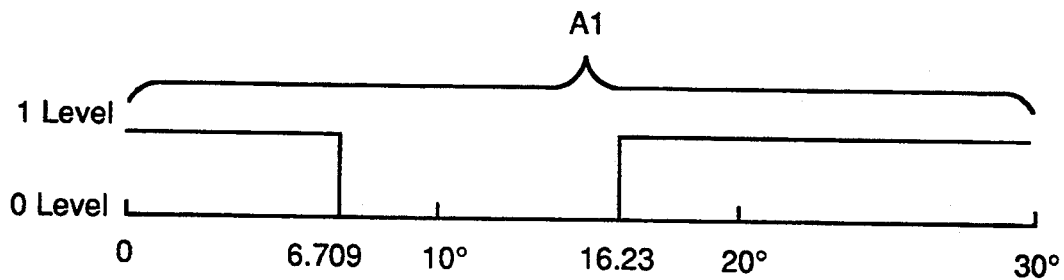
FIG. 6 is a graph showing various values of one bit of the table entry of FIG. 5 for various angles in a one of the plurality of sectors.

The invention also comprises memory means embodied as a programmable read only memory (PROM) 130 for storing firing patterns signals defining on/off status of switching devices making up the inverter circuit 102. The firing pattern signals are preferably stored in pattern tables as shown in FIGS. 4–6.

Figure 2:
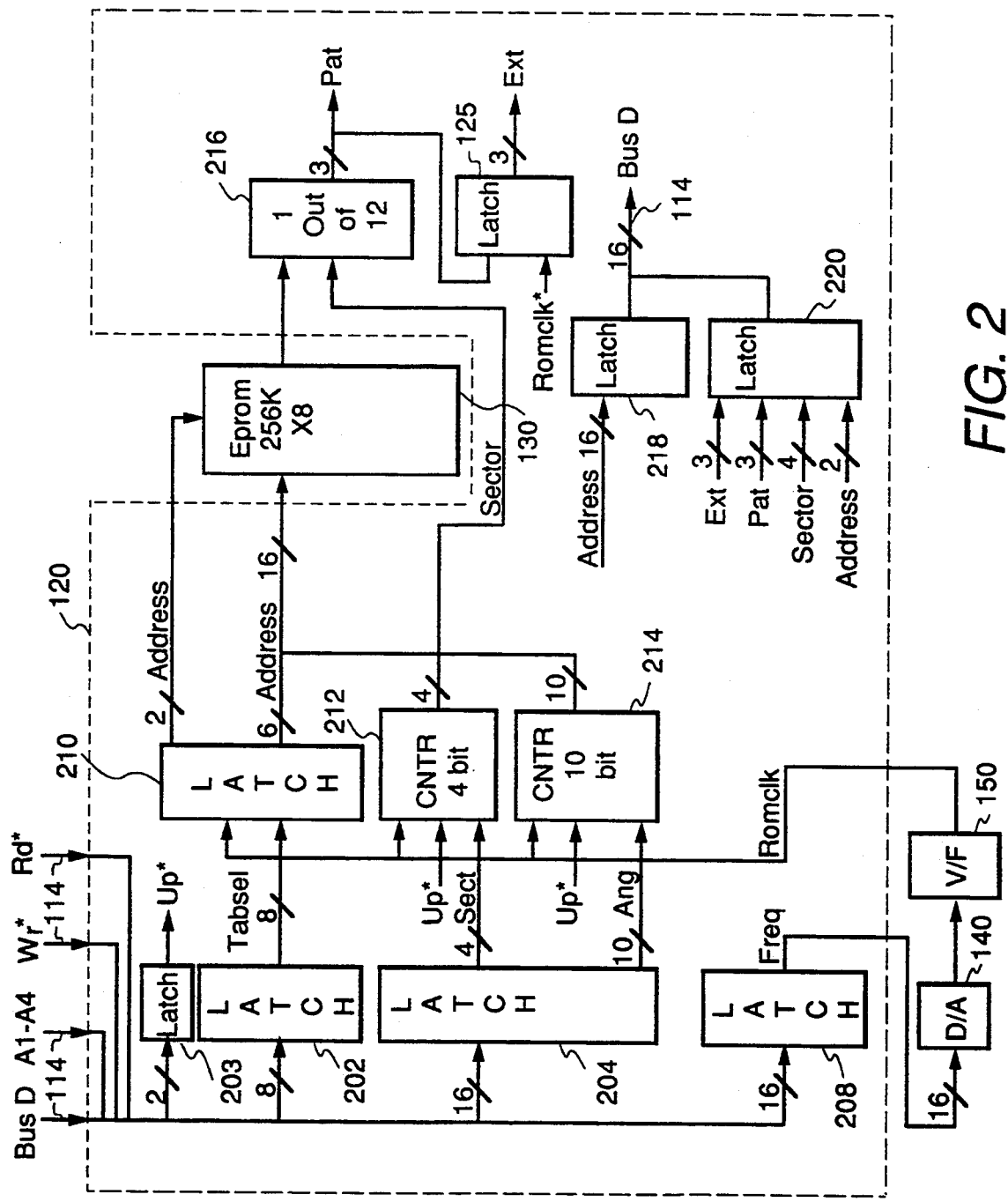
FIG. 2 is a block diagram showing more detail of circuit elements of FIG. 1.

FIG. 2 is a block diagram showing more detail of circuit elements of FIG. 1. As shown in FIG. 2, PGA 120 includes latch 202, latch 203, latch 204, latch 208, latch 210, sector counter (CNTR) 212, angle counter (CNTR) 214, one-out-of-twelve circuit 216, latch 125 (which was previously shown in FIG. 1), latch 218, and latch 220. It will be understood that other embodiments of the present invention may include alternate means for performing the functions performed by PGA 120, such as, for example, digital circuitry.

As shown in FIG. 2, signal line 114 from processor 112 includes a 16-bit signal BusD, four address lines A1–A4, and read/write signals Rd* and Wr*. Processor 112 also receives from PGA 120 the signals Ext, Pat, Sector, Address (16 bits), and Address (2 bits), on line 114 as described below. It is understood that other signals may be used that are not shown in the Figure. For example, clocking circuitry is not shown to enhance the clarity of the Figures.

Address signals A1–A4 are used by processor 112 to address latches 202, 203, 204, 208, 218, and 220, for example. Processor 112 can load a one-bit UP* signal into latch 203. Latch 203 sends the UP* signal to both counters 212 and 214. The invention includes counter means, which are preferably embodied in counters 212 and 214. Counters 212 and 214 output successively incremented or decremented during successive periods of a ROMCLK signal, depending on a value of the UP* signal.

Processor 112 can also load an eight-bit table select (Tabsel) value into latch 210 through latch 202. The invention comprises writable table select means, which preferably is embodied in latch 210. The eight-bit Tabsel value from latch 210 is used to select one of a plurality of pattern tables stored in PROM 130.

Processor 112 can also load a four-bit sector value into counter 212 and a 10-bit angle value into counter 214. These loaded values reset the current values of the counters. The 10-bit output of counter 214 is used to address successive ones of a plurality of entries in the selected table of PROM 130. Thus, latch 210 and counter 214 output successive 18-bit addresses (8+10) to PROM 130, which is preferably a 256K×8 EEPROM, ($2^{18}=256K$). The four-bit output of counter 212 is used by one-out-of-twelve circuit 216 to generate signals for successive sectors, as described below. The invention comprises a firing pattern generator means, which is preferably embodied in circuit 216. Counter 212 is preferably a modulo-12 counter.

It will be understood that the number of bits in the tables, counters, and latches described herein are exemplary only, and may differ depending on the size and number of tables, etc., in other embodiments of the invention. It should be noted that one advantage of the described embodiment is that processor 112 can switch between tables in PROM 130 without changing the current angle and/or sector values, and vice versa.

Processor 112 can also set a 16-bit frequency value into D/A converter 140, which converts the value to an analog form and inputs it to V/F converter 150. The invention comprises clock means, which is preferably embodied in D/A converter 140 and V/F converter 150. V/F converter 150 is preferably a voltage controlled oscillator (VCO). The output of V/F converter 150 (ROMCLK) is used as a clock to increment (or decrement, depending on the UP* signal) counters 212 and 214. When counter 214 rolls over (returns to zero) after 1024 counts, counter 212 is incremented (or decremented). The signal ROMCLK is also used to synchronize latch 210 and latch 125.

Figure 3:
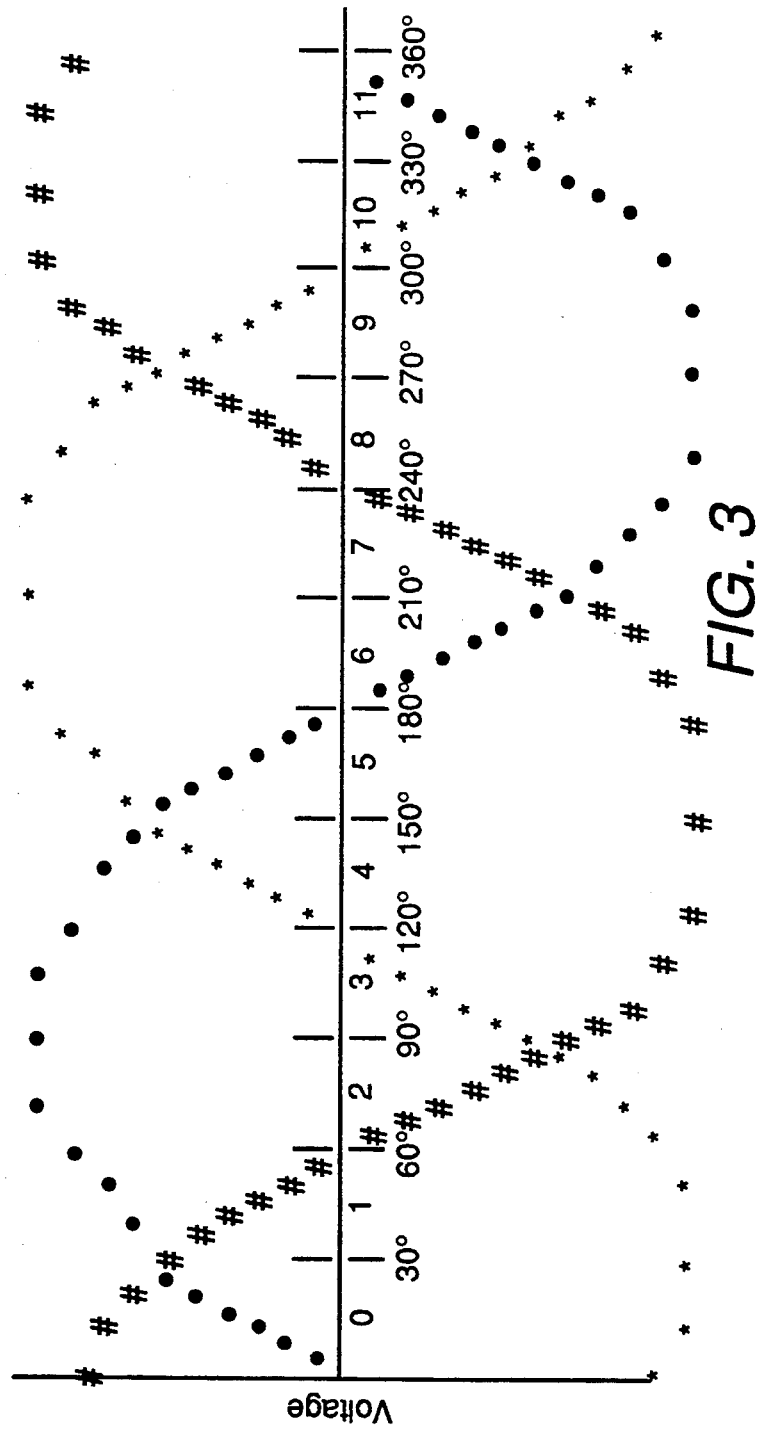
FIG. 3 is a graph showing an example of three phase output of the inverter for a plurality of sectors, and for a plurality of angles within each sector.

FIG. 3 is a graph showing an example of three phase output of inverter 102 over time. The X axis of FIG. 3 represents successive ones of a plurality of sectors 0–11, where each sector is divided into 1024 angle divisions. Each sector corresponds to 30° of output of X, Y, and Z. The method used by circuit 216 to obtain outputs X, Y, and Z will be explained below with regard to FIG. 7. The Y axis of FIG. 3 represents voltage.

Next, a preferred format of PROM 130 will be described with regard to FIGS. 4–6. FIG. 4 shows a data structure in PROM 130. PROM 130 preferably includes 50 pattern tables (although in the described embodiment, there is room for 256 tables in PROM 130). The pattern tables are selected by latch 210. Each pattern table in PROM 130 includes 1024 entries (addressed by counter 214). In the described embodiment, each pattern table is used to generate output at a different percentage of a maximum voltage output. In the described embodiment, the tables represent successive 2% increments. For example, a first table is used to generate output at 2% of a maximum voltage output, a tenth table is used to generate output at 20% of the maximum voltage, and a fiftieth table is used to generate output at 100% of a maximum voltage. Other embodiments may include more or fewer tables, or may include more than one table per voltage level.

FIG. 5 shows a format of one entry in one of the tables of FIG. 4. The three lower-most bits (bits 0–2) store firing values respectively designated A1, B1, and C1 for the sector of 0°–30°. The next three low bits (bits 3–5) store firing values respectively designated A2, B2, and C2 for the sector of 30°–60°. The two highest bits of an entry are unused in the described embodiment. Thus, each of the 1024 entries in a pattern table stores firing data for two different sectors. Because the waves A, B, and C of FIG. 3 are out of phase with each other by 120°, firing data for only two sectors (0°–30° and 30°–60°) may be used to generate 360° of firing data.

An entire pattern table is shown in Appendix A. The table in Appendix A includes data preferably used to generate an output at 82% of a maximum voltage. Thus, in the described embodiment, the table of Appendix A would be stored as a forty-first table in PROM 130. FIG. 6 shows approximate values of firing data A1 over 0°–30°. As can be seen from the first entry in the pattern table of Appendix A, bit 0, which corresponds to firing data A1 shown in FIG. 6, has a value of "1". In an entry corresponding to an angle of 6.709°, the value of A1 is "0". Then, in an entry corresponding to an angle of 16.23°, the value of A1 is again "1". Thus, the value of A1 in the pattern table of Appendix A corresponds to the values of A1 shown in FIG. 6.

Similar graphs of B1, C1, A2, B2, and C2 can be generated from the pattern table of Appendix A. In the described embodiment, the firing values A1 through B3 in the pattern tables are generated offline in a manner known to persons of ordinary skill in the art. The tables values are generally selected to optimize a number of switching cycles and a harmonic output voltage generated.

FIG. 7 is a table showing which bits of a table entry having the format of FIG. 5 are used by circuit 216 to create firing data for inverter 102. As shown in FIG. 7, output data for all sectors can be generated using the output of PROM 130 and the four-bit sector signal from counter 212. As an example, for sector 0 (0°–30°), circuit 216 outputs the three lowermost bits of the successive entries output from PROM 130 (A1, B1, and C1) as X, Y, and Z, respectively. As a further example, for sector 1 (30°–60°), circuit 216 outputs bits 3–5 of the successive entries output from PROM 130 (A2, B2, and C2) as X, Y, and Z, respectively. As a further example, for sector 2 (60°–90°), circuit 216 outputs negations (represented by an asterisk in FIG. 7) of the three lowermost bits of the successive entries output from PROM 130. However, the negated bits are output in the order of B1, C1, A1 to become X, Y, and Z, respectively.

The previous discussion describes the operation of PGA 120, PROM 130, V/F converter 150 and related circuitry. The following explanation describes the operation of processor 112 in the described embodiment of the invention. In the described embodiment, processor 112 is "interrupt driven," and is interrupted approximately every 2 to 3 milliseconds by interrupt circuitry (not shown). This interrupt circuitry will not be described in detail herein because it is of a type known to persons of ordinary skill in the art. The invention comprises memory means, which is preferably embodied in memory 113 and processor means, which is preferably embodied in processor 112. In the described embodiment, the following method is performed, for example, by processor 112 executing software stored in memory 113.

Figure 8:
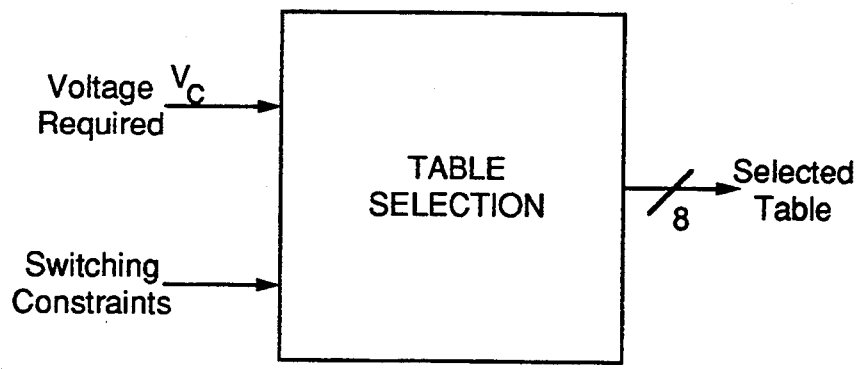
FIG. 8 is a data flow diagram showing a method used by a processor of FIG. 1 to select one of a plurality of tables of the data structure of FIG. 4.
Figure 9:
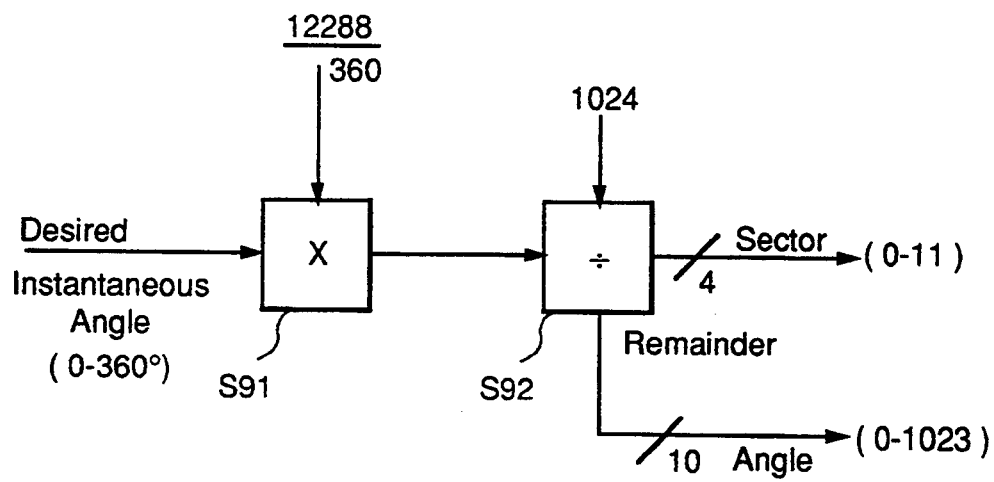
FIG. 9 is data flow diagram showing a method used by the processor of FIG. 1 to set an instantaneous angle.
Figure 10:
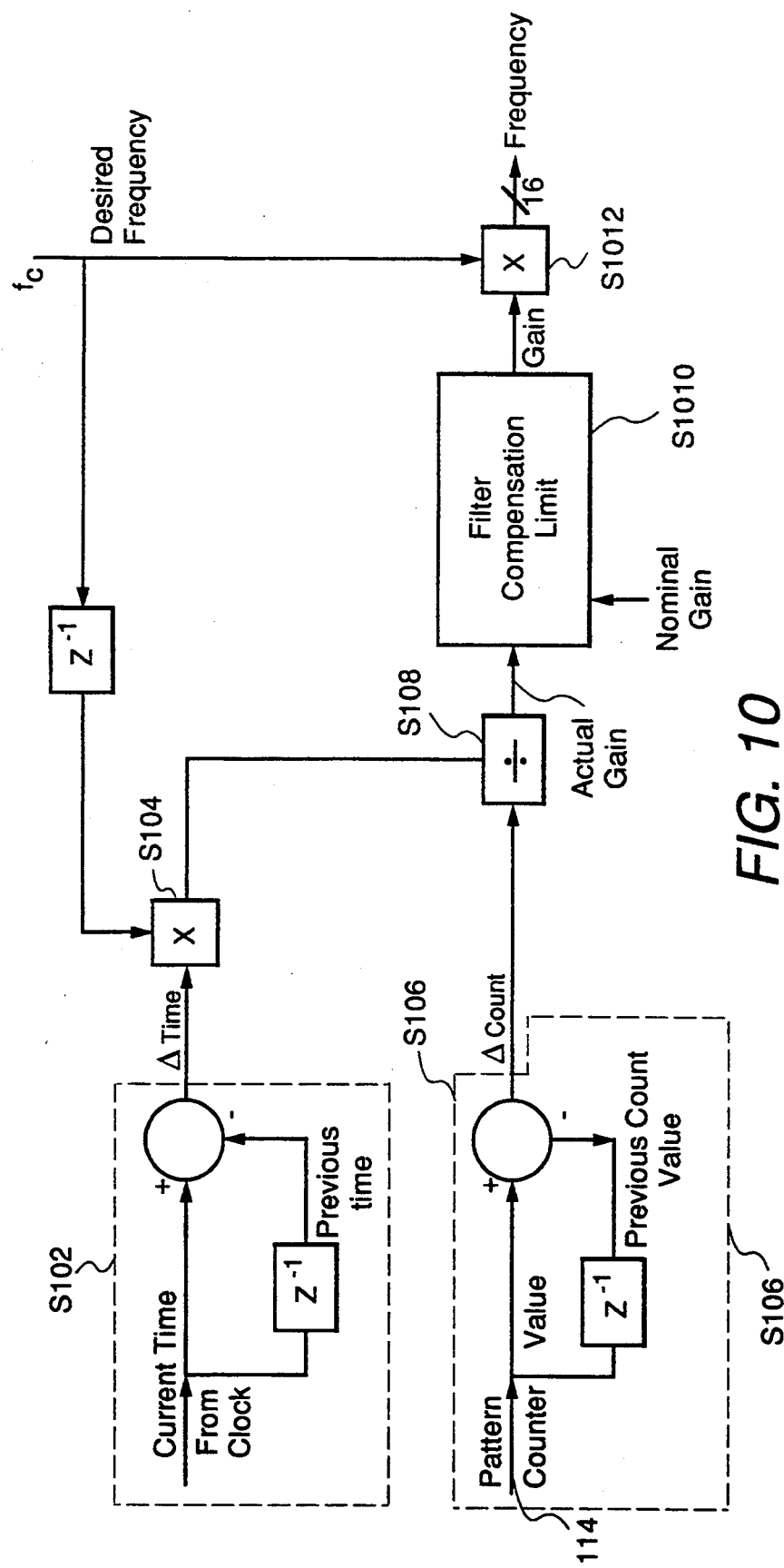
FIG. 10 is data flow diagram showing a method used by the processor of FIG. 1 to set a frequency sent to a V/F converter of FIG. 1.

FIG. 8 is a data flow diagram 800 showing a method used by processor 112 to select one of the tables of the data structure of FIG. 4 in PROM 130. FIG. 9 is a data flow diagram 900 showing a method used by processor 112 to instantaneously set the angle used to address PROM 130 and to set the sector used by circuit 216. FIG. 10 is data flow diagram showing a method used by processor 112 to set a frequency sent to V/F converter 150. Thus, FIGS. 8–10 show methods performed by processor 112 to control the amplitude, phase (instantaneous address/angle of the PROM 130), and frequency of the fundamental component of the motor voltage when mode switch 124 selects output from PGA 120.

FIG. 8 is a data flow diagram 800 showing a method used by processor 112 to select one of the tables of the data structure of FIG. 4 in PROM 130. Desired voltage Vc is input, either from an outside source (not shown) or from another process performed by processor 112. As described above, in a preferred embodiment, each table in PROM 130 represents successive 2% percentages of a maximum voltage. Thus, in the preferred embodiment, a table select value is equal to the input voltage percentage divided by 2. Thus, the switching constraint signal shown in FIG. 8 is not used in some embodiments of the present invention. The output of FIG. 8 is preferably input to latch 202 of FIG. 2.

Other embodiments may use different methods of determining a table select value. For example, in an embodiment having a plurality of tables for each voltage level, a multi-bit switching constraint signal may select between the plurality of tables for the indicated voltage. Other embodiments may use more sophisticated representations of switching constraints.

FIG. 9 is a data flow diagram 900 showing a method used by processor 112 to instantaneously set the angle used to address PROM 130 and the sector used by circuit 216. In FIG. 9 a desired instantaneous angle between 0° and 360° is input either from an outside source (not shown) or from another process performed by processor 112. The input angle is converted to units of "angles" (i.e., 1/1024 of a 30° sector) by multiplying the angle value in degrees by a ratio (12288/360), where the 12288 is a total number of angles in 360° (1024 angles/sector×12 sectors=12288 angles) in step S91. In step S92, the number of angles from step S91 is converted to a sector value by division by 1024. The remainder of this division is the angle value. Persons of ordinary skill in the art will understand that certain rounding computations may also be performed. The output of FIG. 9 is preferably input to latch 204 of FIG. 2.

FIG. 10 is data flow diagram showing a method used by processor 112 to set a frequency sent to V/F converter 150. The method of FIG. 9 also compensates for errors occurring in D/A converter 140 and V/F converter 150. The invention includes independent second clock means, which is preferably embodied in clock 111. In step S102, processor 112 calculates a delta time value by subtracting a previous time value (of clock 111) from a current value of clock 111. The delta time value is multiplied by a previous desired frequency value in step S104. In step S106 processor 112 calculates a delta count value by subtracting a previous counter value (angle and sector) from a current counter value (angle and sector) received on line 114 from PGA 120. In step S108, an actual gain is calculated by taking a ratio between the output of step S104 and the output of step S106. In step S1010, the actual gain is filtered in accordance with a nominal gain (e.g., "1"). In a preferred embodiment, step S1010 uses a low pass filter. In step S1012, the output of step S1010 is multiplied by the desired frequency fc (see FIG. 1) to yield a new frequency value. The output of FIG. 10 is preferably input to latch 208 of FIG. 2. The current time, current desired frequency, and current count value (angle and sector) are saved to be used during the next time processor 112 performs the interrupt routine.

The UP* signal of FIG. 2 is set by processor 112 in accordance with the F/R (forward/reverse) signal. It will be understood by persons of ordinary skill in the art that step S106 of FIG. 10 preferably takes the UP* signal into account when calculating a delta count value, because processor 112 must know whether the counters are being incremented or decremented to determine delta count. Furthermore, it will be understood by persons of ordinary skill in the art that step 106 of FIG. 9 must take into account the possibility that the counter may "wrap around" between interrupts to processor 112.

The above description does not discuss in detail how signals Ext or Pat received by processor 112 from PGA 120 are used. Other embodiments may also monitor these signals. The above description does not discuss in detail how the two-bit address signal from PGA 120 is used or how the top 6 bits (table select value) of the 16-bit address signal from PGA 120 is used. Other embodiments may also monitor these signals.

In a preferred embodiment of the invention, processor 112 switches mode switches mode switch 124 to accept output from TI PWM controller 106 at desired voltages Vc that are below 50% of a maximum voltage level. For values of Vc above 50% of the maximum, processor 112 switches mode switch 124 to accept output from latch 125. Transition from PWM control of the inverter to square wave control is smoothly handled in accordance with the normal operation of the invention such that no special transition arrangements need to be made as in the prior art. Other embodiments may switch modes at different times, or may not include PWM controller 106.

Thus, the present invention can store 360° worth of data in a reduced space. Furthermore, the present invention can control the amplitude, phase (instantaneous address/angle), and frequency of the fundamental component of the motor voltage.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A control circuit, initialized and adjusted by a processor means, for generating firing signals for an inverter for converting dc voltage to three phase variable amplitude and frequency ac voltage, comprising:
   memory means for storing firing pattern signals defining on/off status of switching devices making up the inverter circuit, the memory means storing firing pattern signals only for a predetermined range of degree values that is smaller than a range of 0° through 360°;
   clock means for generating a variable frequency clock signal in accordance with a received variable signal value;
   writable counter means coupled for receiving the variable frequency clock signal and for outputting successive addresses to the memory means to cause the memory means to output successive ones of the firing pattern signals; and
   firing pattern generating means, connected to the memory means, for inputting the firing pattern signals output by the memory means and for generating firing signals for a range of values larger than the range stored in the memory means.

2. The control circuit of claim 1, wherein the memory means stores firing pattern signals only for a predetermined range of 0° through 60°.

3. The control circuit of claim 1, wherein the memory means stores one firing pattern signal for 0°–30° and for 30°–60° in one entry in a table of the memory means.

4. The control circuit of claim 1, wherein the writable counter means includes an angle counter and a sector counter.

5. The control circuit of claim 1, wherein the writable counter means includes a 10-bit angle counter.

6. The control circuit of claim 1, wherein the writable counter means includes a four-bit sector counter.

7. The control circuit of claim 1, wherein the firing pattern generating means generates firing signals for a range of 0° through 360°.

8. A control circuit for generating firing signals for an inverter for converting dc voltage to three phase variable amplitude and frequency ac voltage, comprising:
   memory means for storing a plurality of firing pattern signals defining on/off status of switching devices making up the inverter circuit;
   clock means for generating a variable frequency clock signal in accordance with a received variable frequency value;
   readable/writable counter means for outputting an address to the memory means in accordance with the variable clock signal to cause the memory means to output a one of the firing pattern signals; and
   processor means for monitoring the output of the readable/writable counter means and for sending a new frequency value to the clock means to control the frequency of the three phase ac voltage generated by the inverter in accordance with the monitored value from the readable/writable counter means.

9. The control circuit of claim 8, wherein the clock means includes a voltage controlled oscillator.

10. The control circuit of claim 8, wherein the processor means includes means for monitoring the output of an angle counter and a sector counter.

11. The control circuit of claim 8, wherein the processor means includes means for calculating a gain in the counter means and means for calculating the new frequency value to adjust for the gain.

12. The control circuit of claim 11, wherein the gain calculating means includes an independent second clock means for determining a gain.

13. A control circuit for generating firing signals for an inverter for converting dc voltage to three phase variable amplitude and frequency ac voltage, comprising:
   memory means for storing a plurality of firing pattern signals defining on/off status of switching devices making up the inverter circuit;
   clock means for generating a variable frequency clock signal in accordance with a received variable frequency value;
   writable counter means for outputting an address to the memory means in accordance with the clock signal to cause the memory means to output a one of the firing pattern signals; and
   processor means for receiving a desired frequency value and for sending the desired frequency value to the clock means to control the frequency of the three phase ac voltage generated by the inverter in accordance with the monitored value.

14. The control circuit of claim 13, wherein the clock means includes a voltage controlled oscillator.

* * * * *